United States Patent Office 2,945,016
Patented July 12, 1960

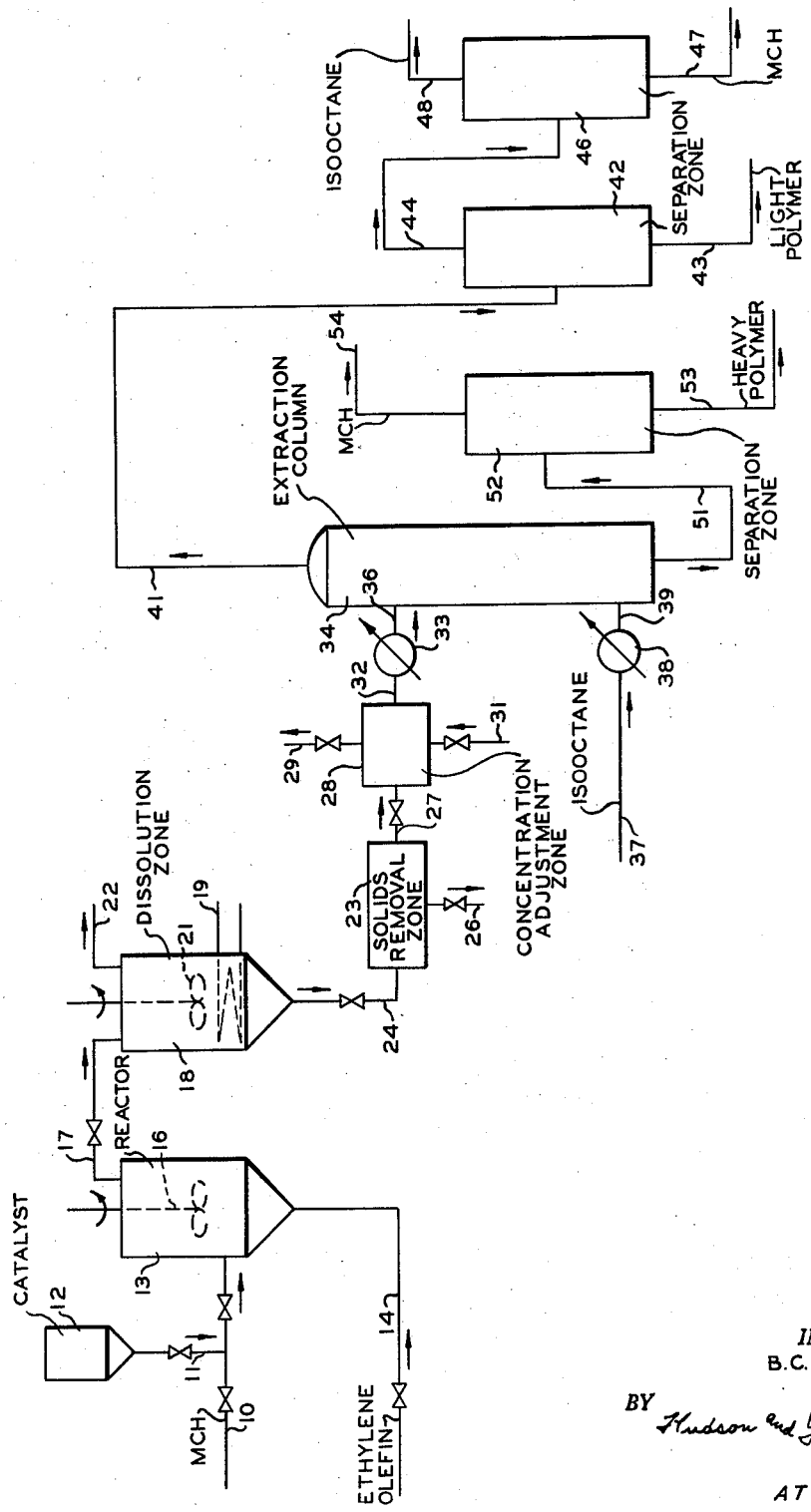

2,945,016
SEPARATION OF POLYMERS

Bruce C. Benedict, Bartlesville, Okla., assignor to Phillips Petroleum Company, a corporation of Delaware Filed Feb. 27, 1956, Ser. No. 567,855

12 Claims. (Cl. 260—94.9)

This invention relates to the recovery of polymers. In one aspect, it relates to a method for separating a polymer into two or more fractions having different properties. In another aspect, it relates to the purification of polymers. In still another aspect, it relates to an improved fractionating agent for separating polymers into various fractions.

There is described in the literature various methods for producing normally solid and semisolid polymers. For example, hydrocarbons, such as ethylene, propylene, isobutene, butadiene and styrene can be polymerized, either individually or in various admixtures with one another, to produce solid or semisolid polymers. Recently considerable attention has been directed toward the production of solid polymers of ethylene. The polymerizations are generally carried out in the presence of catalyst, and during the production processes the polymers are frequently handled at various points in the form of solutions thereof in liquid solvents. One class of solvents which has been proposed for use in the polymerizations comprises naphthenic hydrocarbons. It becomes important, therefore, to be able to recover the polymers readily from their solutions. It would also be desirable to separate the polymers into fractions having different properties, such as different molecular weights.

It is an object of this invention to provide a process for the recovery of polymers from solutions thereof.

Another object of the invention is to provide a process for fractionating a polymer into two or more fractions having different properties.

Still another object of the invention is to provide an improved fractionating agent for separating polymers into various fractions comprising polymers having substantially the same molecular weights.

A further object of the invention is to separate solids from polymer solutions.

Other and further objects and advantages of the invention will become apparent to one skilled in the art upon reference to the accompanying disclosure.

In accordance with a broad aspect, the process of this invention comprises adding an open chain hydrocarbon to a solution of normally solid polymer in a cyclic hydrocarbon solvent, thereby causing the formation of a polymer-rich phase and a solvent-rich phase, and recovering at least one of said phases.

In accordance with a preferred embodiment of the invention, a polymer is separated into two or more fractions having different properties, such as different molecular weights, by contacting a solution of the polymer in a cyclic hydrocarbon with a paraffinic hydrocarbon, said contacting occurring at a temperature at least as high as the upper cloud point of the solution of said polymer in said cyclic and paraffinic hydrocarbons, so that a polymer-rich phase separates from a solvent-rich phase, separating the phases from one another, and recovering polymer from each of the separated phases. The actual temperature at which the contacting takes place so as to obtain a desired separation will depend upon several variables, including the particular polymer being treated, the particular cyclic hydrocarbon solvent and paraffinic fractionating agent utilized and the concentration of the polymer in these materials. The minimum temperature at which such contacting occurs is generally at least as high as the upper cloud point of the solution of the polymer in the cyclic and paraffinic hydrocarbons while the maximum temperature will be below that at which thermal decomposition of the polymer occurs. While it is impractical to set out any absolute temperature limits because of the many variables involved, it can be stated that the temperature will usually be in the range of 300 to 500° F., although in some cases the temperature may be outside of this range.

It has been found that there is a peculiar solubility effect when polymers of the type described herein are dissolved in certain hydrocarbon solvents. Normally, the solubility of a solute in a solvent increases as the temperature is raised, but in the instant case when the temperature of the polymer solutions is increased, there separates out of the solutions a solvent-rich phase and a polymer-rich phase. This phenomenon can be termed an inverse solubility effect and is in no way related to the anti-solvent effect described in the literature. The temperature at which the polymer separates out of solution as a separate liquid phase when the temperature of the solution is raised is designated herein as the upper cloud point of the polymer solution.

The upper cloud point of a solution of any particular polymer in a hydrocarbon or mixture of hydrocarbons depends on the particular hydrocarbons, the nature of the polymer, the concentration of polymer in the hydrocarbons, the molecular weight of the polymer, and other factors, so that a definite temperature range applicable to all solutions of polymer in hydrocarbons cannot be stated with complete accuracy. Nevertheless, the cloud point of any particular polymer-hydrocarbon mixture can be readily determined by those skilled in the art by mere routine test, which comprises heating the particular mixture to a temperature at which a single homogeneous liquid solution or phase, as detected by visual observation, is obtained, heating this solution at gradually increasing temperatures until cloudiness, which indicates the formation of a second liquid phase, is detected. The temperature at which the cloudiness appears is the upper cloud point. When the solution being tested contains suspended catalyst, as when a polymerization effluent from an operation of the type subsequently described is tested, the precise detection of the upper cloud point is somewhat more difficult than when suspended catalyst is absent. However, the upper cloud point can be detected by visual observation even though suspended catalyst is present, and the detection is sufficiently accurate to enable one skilled in the art to practice the present invention. The accuracy of the determination can be increased in many cases by the use of an instrument, such as a nephelometer, a photometer, or any other suitable instrument which measures the light absorption or the scattering effect produced by the precipitation of additional solid or liquid in a mixture. Such instruments are well known in the analytical and instrumental control arts. A more complete discussion of cloud points and the method for their determination is contained in the copending U.S. application of L. B. Croley and G. E. Hanson, Serial No. 510,199, filed May 23, 1955, now Patent Number 2, 837,504.

The present invention is broadly applicable to any polymer which is soluble in a cyclic hydrocarbon solvent and which, when in solution in such a solvent, is caused to separate out as a polymer-rich phase upon contacting the solution with an open chain hydrocarbon at a temperature at least as high as the upper cloud point of the solution of polymer in the mixture of cyclic and open chain hydrocarbons. Thus, the invention is applicable to polymers prepared by polymerizing olefins in the presence of catalysts comprising organometallic compounds and inorganic oxide catalysts in general as well as polymers prepared by high temperature and pressure processes utilizing peroxide catalysts. Examples of catalysts comprising organometallic compounds, which can be used to polymerize olefins, such as ethylene, propylene, 1-butene and styrene, include those comprising an organometal and a halide of a group IV metal of the periodic table, such as triethylaluminum and titanium tetrachloride; and an organometal halide and a group IV metal halide, such as diethylaluminum chloride and titanium tetrachloride.

The invention is, however, especially applicable to the unique polymers obtained according to the copending patent application of Hogan and Banks, Serial No. 476,306, filed December 20, 1954, and now abandoned. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinary associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and is then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum chain length of 8 carbon atoms and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range 150 to 450° F. The pressure can range from approximately atmospheric to as high as 1000 p.s.i. The polymerization can be conducted in the gaseous or in the liquid phase.

A satisfactory method of conducting the polymerization comprises contacting, with the catalyst, a mixture of said olefin with a hydrocarbon solvent which can exist as a liquid at the temperature of polymerization. In such a case, the reaction pressure need only be sufficient to maintain the solvent substantially in the liquid phase and will ordinarily range from about 100 to about 700 p.s.i. When a solvent is used, the reaction effluent comprises a mixture of solvent and polymer, and, at least at one point in the process, is usually a homogeneous solution of polymer in solvent. A method for recovering the polymer from the solution is clearly necessary. The present invention effects such a recovery by contacting a solution of polymer in a naphthenic hydrocarbon with a paraffinic hydrocarbon at a temperature at least as high as the upper cloud point of the paraffinic hydrocarbon, and recovering the polymer-rich phase which precipitates at the aforementioned temperature as well as the solvent-rich phase from which the polymer precipitates.

One class of solvents which can be advantageously used in the above-described polymerization are naphthenic hydrocarbons. Naphthenic hydrocarbons are employed which have from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of solvents includes condensed ring compounds such as decaline and the alkyl derivatives thereof. A preferred subclass of naphthenic hydrocarbons within the above defined general class is constituted by those naphthenic hydrocarbons having from 5 to 6 carbon atoms in a single ring and from 0 to 2 methyl groups as the only constituents on the ring. Thus, the preferred solvents are cyclopentane, cyclohexane, methylcyclopentane, methylcyclohexane, the dimethylcyclopentanes and the dimethylcyclohexanes. These compounds are preferred because they are readily removable from the catalyst surface after contact therewith and are readily separable from polymer dissolved in the solvents.

The naphthenic hydrocarbons are also very effective in removing polymer deposited upon the catalyst. Thus, when an olefin is polymerized by mixing the olefin with a paraffinic solvent and contacting the mixture with a fixed bed of chromium oxide catalyst under conditions described in the cited application of Hogan and Banks, ultimately a substantial amount of polymer accumulates on the catalyst. The polymerization can then be interrupted and the polymer dissolved from the catalyst by contacting the catalyst with a naphthenic hydrocarbon at a temperature at least 25° F. higher than the polymerization temperature. The dissolved polymer can then be recovered from the resulting solution by proceeding in accordance with the present invention, i.e., contacting the solution with a paraffinic hydrocarbon at a temperature at least as high as the upper cloud point of the solution of the polymer in the naphthenic and paraffinic hydrocarbons.

The present invention is generally applicable to polymers of the type herein described which have molecular weights in the range of 1000 to 100,000 or higher. However, in most cases, the molecular weights will be in the range of 10,000 to 80,000, and more often, 10,000 to 60,000, and the invention is of special applicability to polymers having a molecular weight in the range of 25,000 to 50,000. Such polymers are ordinarily obtained by the Hogan and Banks process by utilizing the catalyst in the form of a slurry or suspension in the hydrocarbon solvent and maintaining the polymerization temperature in the range of 200 to 350° F., preferably 250 to 350° F. As discussed in the cited Hogan and Banks application, the molecular weight of the polymer is dependent on the polymerization conditions, particularly the temperature, and polymer having a molecular weight from 25,000 to 50,000 is readily obtainable in the polymerization temperature range of 200 to 350° F., other reaction conditions being as previously described and including the use of a slurry catalyst.

A more complete understanding of the invention may be obtained by referring to the drawing, which is a flow diagram illustrating a preferred embodiment of this invention. The invention will be discussed with relation to the polymerization of ethylene using methylcyclohexane as the solvent and isooctane as the fractionating agent, but it is to be understood that it is not intended to so limit the invention.

As shown in the drawing, a naphthenic hydrocarbon solvent, such as methylcyclohexane, enters the system through inlet line 10. A catalyst, which preferably has a particle size in the range of about 40 to about 100 mesh, is added to the solvent by means of line 11 connecting catalyst storage tank 12 to line 10. The slurry of catalyst in solvent which is thus formed is then pumped into reactor 13. The catalyst can be, for example, a chromium oxide-silica-alumina catalyst prepared by impregnating a 90 weight percent silica-10 weight percent alumina gel composition with chromium trioxide, drying, and heating in air to obtain a catalyst composition containing approximately 2.5 weight percent chromium in the form of chromium oxide of which approximately half is in the form of hexavalent chromium.

An olefin, such as ethylene, enters the system through inlet line 14 and is intimately contacted with the catalyst slurry in reactor 13. A suitable stirring means 16, driven by a motor, not shown, is provided to facilitate contacting and maintain the catalyst in suspension in the reaction mixture. The reaction zone can be maintained, for example, at 275° F. and 600 p.s.i. with the reaction time ranging from about 15 minutes to about 10 hours. The reactor effluent, which is withdrawn through line 17, comprises a mixture of polymer, solvent, catalyst, and small amounts of unreacted ethylene. Additional solvent can be added to line 17, if desired, in order to obtain a mixture having a suitable viscosity for transfer through the system. The concentration of polymer is ordinarily adjusted to a value in the range from about 1 to about 15 weight percent based on polymer plus solvent. The resulting mixture is passed into dissolution zone 18 wherein the mixture is heated by means of a heating means, such as heating coil 19, and agitated by means of stirring means 21 to ensure complete solution of polymer in the solvent. The dissolution zone is generally maintained at a temperature from 25 to 50° F. higher than reactor 13, a suitable temperature ordinarily being approximately 250 to 400° F. The pressure in dissolution zone 18 is ordinarily lower than that in reactor 13, for example, about 75 to 150 p.s.i. lower, but is still high enough to maintain the solvent in liquid phase. The increased temperature and the reduced pressure can be utilized to remove any unreacted ethylene or other gas, which can be withdrawn through outlet line 22.

The resulting solution containing suspended catalyst is removed from dissolution zone 18 and passed to solids removal zone 23 by means of line 24. The solids removal zone, which can be a filter, a centrifuge, or similar equipment suitable for removal of solids from liquids, is operated at approximately the same temperature and pressure as the dissolution zone. Catalyst is withdrawn from the system through outlet 26 while the clarified solution is passed through line 27 into concentration adjustment zone 28. In this latter zone, solvent can be removed, for example, by flashing and removal through outlet 29, or added for dilution through inlet 31, if either of these operations is considered necessary. Often, however, no further concentration adjustment is necessary when the concentration of polymer in the solvent is within the range previously set forth.

The solution of polymer in methylcyclohexane is removed from zone 28 through line 32 and passed into heater 33. In heater 33, the solution is heated to about the temperature at which the solution is to be subsequently contacted with a fractionating agent. Under some conditions of operation, the solution on removal from zone 28 may be at a temperature higher than that at which the contacting is to take place, in which case heater 33 will be replaced with a cooler. Or if the stream from zone 28 is at a temperature about equal to that at which contacting is to occur, the heat exchange equipment can be omitted from the system or by-passed. The heated solution is then passed into extraction column 34 through line 36. While the separation of polymer from solvent, in accordance with the process of this invention, can be carried out in any suitable extraction apparatus, it is preferred to operate with an extraction column. The solution is fed to the column through line 36 at a point near the top of the column while the fractionating agent of this invention enters the system near the bottom through inlet line 37.

The fractionating agents used in the process of this invention comprise paraffinic hydrocarbons such as pentane, hexane, heptane, octane, isooctane, isoheptane, dodecane, tridecane, cetane, and the like. Paraffins which can be used include both normal paraffins and isoparaffins and preferably contain no more than 16 carbon atoms per molecule. The paraffins which are preferred are those containing from 7 to 10 carbon atoms per molecule, and of these paraffins isooctane has been found to be an especially effective fractionating agent.

The paraffinic hydrocarbon, such as isooctane, before introduction into the extraction column, is passed through heater 38 wherein it is heated to a temperature at least as high as the upper cloud point of the solution of the polymer in the naphthenic and paraffinic hydrocarbons. As discussed hereinabove, this temperature is dependent upon several factors, but can be readily determined by routine tests by one skilled in the art. In the case of isooctane, it has been found that this temperature is at least 330° F., and depending upon the molecular weight of the polymer and its concentration in the isooctane the temperature is generally in the range of 330 to 370° F.

The isooctane on entering extraction column 34 through line 39 contacts the solution of polymer in methylcyclohexane at a temperature at least as high as the upper cloud point of the solution of the polymer in the methylcyclohexane and isooctane. As a result of this contacting, a light or extract phase comprising mainly methylcyclohexane, isooctane and lower weight molecular polymer is formed in the upper portion of the extraction zone. This light phase is removed from the extraction column through line 41 and then passed into separation means 42 which can be an apparatus adapted for flashing or distilling the methylcyclohexane and isooctane from the mixture. The lower molecular weight polymers are withdrawn from separator 42 through line 43 while the methylcyclohexane and isooctane are taken overhead through line 44. The overhead stream is then passed into another separation means 46 wherein the methylcyclohexane and isooctane are separated. The methylcyclohexane which is removed from the bottom of separator 46 through line 47 can be recycled to reactor 13 via line 10 while the isooctane taken overhead from separation means 46 through line 48 can be recycled to extraction column 34 via line 37.

The heavy phase which settles to the bottom of extraction column 34 is removed therefrom by means of line 51. This stream which contains the heavier weight polymer and methylcyclohexane is passed into separation means 52, which can be the same type of apparatus as separation means 42. The heavy polymer is removed from separation means 52 through line 53 while the methylcyclohexane is taken overhead through line 54. The methylcyclohexane recovered through line 54 can then be recycled to reactor 13 via line 10.

As indicated hereinabove, the polymerization process of Hogan and Banks can be conducted by utilizing a finely divided suspended catalyst. When such a procedure is used, the reactor effluent contains solid catalyst in suspension, and the catalyst can be removed from the liquid as described above by filtration or other suitable means. It has been found, however, that when a solution of polymer in a naphthenic hydrocarbon containing suspended catalyst is treated as described herein the suspended catalyst is primarily concentrated in the polymer-rich phase which precipitates and thus is at least partially removed from the solvent-rich phase. Thus, in accordance with this invention, at least a preliminary removal of the suspended catalyst from a polymer solution in a naphthenic hydrocarbon can be obtained by contacting the solution with a paraffinic hydrocarbon at a temperature at least as high as the upper cloud point of the solution of the polymer in the naphthenic and paraffinic hydrocarbons and separating the polymer-rich phase which forms.

Since the suspended catalyst or a major portion thereof accompanies the polymer-rich phase, the solvent-rich phase can then be processed, and in many cases no filtration of this phase is necessary. When filtration of the solvent-rich phase is desirable, as when a small amount of suspended catalyst remains in this phase, the filtration is comparatively easily accomplished because of the small amount of solids present. The polymer-rich phase containing the catalyst can be further processed for the recovery of the polymer free of catalyst. In some cases, however, no further separation is necessary as, for example, when the polymer is utilized for purposes in which the presence of solids admixed therewith is not deleterious as, for example, when the polymer is to be used for the fabrication of pipe which is not to be subjected to high pressures. The catalyst can be removed from the polymer, when desired, by diluting the polymer with a suitable solvent, e.g., cyclohexane, and heating to a temperature at which the polymer dissolves. The catalyst can be subsequently filtered from the polymer solution, or again contacted with a fractionating agent as discussed above. When this particular embodiment of the invention is practiced, it is generally desirable that the extraction column be operated at a temperature so that only a relatively small amount of high molecular weight polymers is precipitated. This temperature will generally be at or very near the upper cloud point of the fractionating agent utilized.

The above-described embodiment of the invention can be advantageously employed in conjunction with a polymerization process such as that illustrated in the drawing. In such an application, the polymer solution, containing suspended catalyst, which is removed from dissolution zone 18 is passed into zone 28 and thence into extraction column 34 without prior treatment to remove the catalyst. As a result, the heavy polymer removed from separation means 52 contains the catalyst. The catalyst can then be removed from the polymer as described in the preceding paragraph. Alternatively, the polymer-rich phase from extraction column 34 can be treated by adding additional solvent, if required, heating to a temperature at which the polymer disoslves, and then separating, e.g., by filtration, the catalyst from the polymer solution. The solvent can then be separated from the polymer by distillation or other suitable means. When the catalyst is separated from the polymer by treating the heavy polymer or the polymer-rich phase as described, the volume of solution which is treated is ordinarily small as compared with the volume of the reactor effluent. As a result, the load on the solids removal zone is considerably less than when the entire reactor effluent is treated as discussed with relation to the drawing.

From the foregoing, it will be apparent that I have provided a method whereby a polymer can be readily recovered from a solution thereof in a naphthenic hydrocarbon by contacting the solution with a paraffinic hydrocarbon at a temperature at least as high as the upper cloud point of the solution of the polymer in the naphthenic and paraffinic hydrocarbon. It has also been indicated that when the original solution contains suspended catalyst, the catalyst is concentrated in the heavier phase which separates out when proceeding in accordance with the present invention. Thus, the process of this invention can be utilized as a method for catalyst removal. While the process of this invention has been described in conjunction with a particular process, the polymer need not be fractionated as a part of any particular polymerization process. A polymer, such as solid polyethylene, from any source can be dissolved in a naphthenic hydrocarbon and separated as described hereinabove. Furthermore, while the invention has been described specifically with relation to solutions of polymer in naphthenic hydrocarbons, it is to be understood that the invention is applicable to the separation of polymer from solutions thereof in cyclic hydrocarbons in general, including aromatics, such as benzene or toluene, and cyclic olefins, such as cyclohexene. However, it is noted that it may not be desirable in all cases to utilize these latter materials as solvents in all of the various polymerization reactions to which this invention is applicable.

A better understanding of the invention may be obtained by referring to the following illustrative example which is not intended, however, to be unduly limitative of the invention.

EXAMPLE

A fifteen percent concentration of polyethylene in methylcyclohexane was heated in a charge pot to a temperature between 330 and 340° F. The polyethylene utilized in this example was prepared as described hereinbelow. Isooctane (2,2,4-trimethylpentane) was introduced near the bottom of an extraction column and circulated through the column at the extraction temperature of 361° F. After temperatures had stabilized, the polymer-methylcyclohexane solution was then pumped into the column near the top, using a pump previously calibrated for a rate to give a five percent polymer concentration in the column. The column was operated at a temperature of 361° F. and a pressure of 130 p.s.i.g. The insoluble phase settled to the bottom and was withdrawn. The overhead product went into a heated flash pot from which the product was periodically withdrawn. The overhead product was cooled to room temperature and filtered through paper to eliminate the excess solvent. The low molecular weight overhead product was not analyzed. Properties of the charge material and bottoms product are presented below in the table.

*Table*

| | Charge Polymer | Bottoms Product |
|---|---|---|
| Intrinsic viscosity | 1.762 | 1.843 |
| Molecular weight by I.V. | 43,080 | 45,060 |
| Falling ball brittleness | 72″ | >72″ |

The polyethylene used in this example was obtained by polymerizing ethylene in the presence of a catalyst prepared by depositing chromium oxide on a coprecipitated silica-alumina cracking catalyst (90 weight percent $SiO_2$ and 10 weight percent $Al_2O_3$) and activating the oxide composite with air. The polymerization was carried out in the liquid phase at a temperature between 250 and 325° F., and isooctane was employed as the solvent. The polymer produced by the aforementioned catalyst was recovered by distilling off the isooctane solvent and recovering the residue.

It will be apparent to those skilled in the art that variations and modifications of my invention can be made upon study of the foregoing disclosure. Such variations and modifications are believed to be clearly within the spirit and scope of the invention.

I claim:

1. A process for fractionating a normally solid polymer of an aliphatic 1-olefin to obtain at least two fractions which differ from each other in physical properties which comprises contacting a solution of said polymer in a naphthenic hydrocarbon having from 5 to 6 carbon atoms in naphthenic ring with a paraffinic hydrocarbon containing up to and including 16 carbon atoms per molecule, said contacting occurring at a temperature at least as high as the upper cloud point of the solution of said polymer in said naphthenic and paraffinic hydrocarbons, thereby causing the formation of a polymer-rich phase and a solvent-rich phase; and separately recovering said phases.

2. A process in accordance with claim 1 wherein said naphthenic hydrocarbon is methylcyclohexane and said paraffinic hydrocarbon is isooctane.

3. A process in accordance with claim 2 wherein said contacting occurs at a temperature between 330 and 370° F.

4. A process in accordance with claim 1 wherein said naphthenic hydrocarbon is cyclohexane and said paraffinic hydrocarbon is isoheptane.

5. A process for fractionating a normally solid polymer of an aliphatic 1-olefin to obtain at least two fractions which differ from each other in physical properties which comprises contacting a solution of said polymer in a naphthenic hydrocarbon having from 5 to 6 carbon atoms in a naphthenic ring with a paraffinic hydrocarbon having up to and including 16 carbon atoms per molecule, said contacting occurring at a temperature at least as high as the upper cloud point of the solution of said polymer in said naphthenic and paraffinic hydrocarbons, thereby causing the formation of a polymer-rich phase and a solvent-rich phase; separately recovering said phases; and recovering polymer from each of said separated phases.

6. A process for fractionating a normally solid polymer of an aliphatic 1-olefin to obtain at least two fractions which differ from each other in physical properties which comprises introducing a solution of said polymer in a naphthenic hydrocarbon having from 5 to 6 carbon atoms in a naphthenic ring into an extraction zone; contacting said solution in said extraction zone with a paraffinic hydrocarbon containing up to and including 16 carbon atoms per molecule, said contacting occurring at a temperature at least as high as the upper cloud point of the solution of said polymer in said naphthenic and paraffinic hydrocarbons, thereby causing the formation within said zone of a heavy, polymer-rich phase and a light, solvent-rich phase; separately recovering said light and heavy phases from said extraction zone.

7. A process for fractionating a normally solid polymer of an aliphatic 1-olefin to obtain at least two fractions which differ from each other in physical properties which comprises introducing a solution of said polymer in a naphthenic hydrocarbon having from 5 to 6 carbon atoms in a naphthenic ring into the upper portion of an extraction zone; contacting said solution in said extraction zone with a paraffinic hydrocarbon containing up to and including 16 carbon atoms per molecule introduced into the lower portion of said zone, said contacting occurring at a temperature at least as high as the upper cloud point of a solution of said polymer in said naphthenic and paraffinic hydrocarbons, thereby causing the formation within said zone of a heavy, polymer-rich phase and a light, solvent-rich phase; withdrawing said light phase from the upper portion of said zone; recovering polymer from said withdrawn light phase; withdrawing said heavy phase from the lower portion of said zone; and recovering polymer from said withdrawn heavy phase.

8. The process according to claim 7 wherein said polymer is an ethylene polymer, said naphthenic hydrocarbon is methylcyclohexane, said paraffinic hydrocarbon is isooctane, and said contacting occurs at a temperature between 330 and 370° F.

9. In a process wherein an aliphatic 1-olefin is polymerized in admixture with a naphthenic hydrocarbon having from 5 to 6 carbon atoms in a naphthenic ring in the presence of a catalyst comprising a minor proportion of chromium in the form of chromium oxide, and containing a substantial amount of hexavalent chromium, associated with at least one oxide selected from the group consisting of silica, alumina, zirconia, and thoria, at a temperature in the range of 150 to 450° F., and a pressure sufficient to maintain the reaction mixture substantially in liquid phase, and a mixture comprising said hydrocarbon and product polymer is obtained, the improvement which comprises contacting said mixture with a paraffinic hydrocarbon containing up to and including 16 carbon atoms per molecule, said contacting occurring at a temperature at least as high as the upper cloud point of the solution of said polymer in said naphthenic and paraffinic hydrocarbons, thereby causing the formation of a polymer-rich phase and a solvent-rich phase; separately recovering said phases; and recovering polymer from each of said separated phases.

10. A process for fractionating a mixture comprising a suspension of a particulate solid in a solution of a normally solid polymer of an aliphatic 1-olefin in a naphthenic hydrocarbon having from 5 to 6 carbon atoms in a naphthenic ring which comprises contacting said mixture with a paraffinic hydrocarbon containing up to and including 16 carbon atoms per molecule, said contacting occurring at a temperature at least as high as the upper cloud point of the solution of said polymer in said naphthenic and paraffinic hydrocarbons, thereby causing the formation of a light, solvent-rich phase and a heavy, polymer-rich phase, said heavy phase having associated therewith a major proportion of said particulate solid; and separating said phases.

11. A process in accordance with claim 10 wherein said solid is a catalyst comprising from 0.1 to 10 weight percent of chromium in the form of chromium oxide, including a substantial amount of hexavalent chromium, associated with at least one oxide selected from the group consisting of silica, alumina, zirconia, and thoria.

12. A process in accordance with claim 10 wherein said naphthenic hydrocarbon is methylcyclohexane, said paraffinic hydrocarbon is isooctane, and said contacting occurs at a temperature between 330 and 370° F.

References Cited in the file of this patent

UNITED STATES PATENTS

| | | |
|---|---|---|
| 2,482,056 | Elwell et al. | Sept. 13, 1949 |
| 2,691,647 | Field et al. | Oct. 12, 1954 |
| 2,770,663 | Grote | Nov. 13, 1956 |
| 2,837,504 | Hanson et al. | June 3, 1958 |

OTHER REFERENCES

"The Fractionation of High Polymeric Substances," Cragg and Hammerschlag, Chemical Reviews, August 1946, pages 79–135.